(12) United States Patent
Harrington et al.

(10) Patent No.: US 6,965,542 B1
(45) Date of Patent: Nov. 15, 2005

(54) MILES HAND GRENADE

(75) Inventors: John J. Harrington, Albuquerque, NM (US); James H. Buttz, Albuquerque, NM (US); Alex B. Maish, Corrales, NM (US); Ray R. Page, Albuquerque, NM (US); Herbert E. Metcalf, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/685,106

(22) Filed: Oct. 14, 2003

(51) Int. Cl.⁷ .............................. G01S 3/808
(52) U.S. Cl. ........................ 367/127; 367/128
(58) Field of Search ............... 33/700; 73/597; 367/127, 128

(56) References Cited

U.S. PATENT DOCUMENTS

| | | | |
|---|---|---|---|
| 3,772,594 A * | 11/1973 | Kuehnast | .................. 324/72 |
| 4,751,689 A * | 6/1988 | Kobayashi | ............... 367/127 |
| 4,939,701 A * | 7/1990 | Brunner et al. | ............. 367/128 |
| 5,191,328 A * | 3/1993 | Nelson | .................. 340/870.06 |
| H1451 H | 6/1995 | Campagnuolo | |
| 6,569,011 B1 | 5/2003 | Lynch et al. | |
| 6,579,097 B1 | 6/2003 | Sampson et al. | |
| 6,614,721 B2 * | 9/2003 | Bokhour | .................... 367/128 |

FOREIGN PATENT DOCUMENTS

GB    2 170 907 A    *    8/1986

OTHER PUBLICATIONS

Undated U.S. Department of Energy specification for MILES equipment pp. 1, 16, and 17; no date.
Undated specification sheet by Schwartz Electro-optics Inc. 2 pages; Jul. 9, 2000.

* cited by examiner

Primary Examiner—Stephen M. Johnson
(74) Attorney, Agent, or Firm—George H. Libman; William R. Conley

(57) ABSTRACT

A simulated grenade for MILES-type simulations generates a unique RF signal and a unique audio signal. A detector utilizes the time between receipt of the RF signal and the slower-traveling audio signal to determine the distance between the detector and the simulated grenade.

14 Claims, 4 Drawing Sheets

MILES HAND GRENADE

The United States Government has rights in this invention pursuant to Department of Energy Contract No. DE-AC04-94AL85000 with Sandia Corporation

CROSS REFERENCE TO RELATED APPLICATIONS (Not Applicable)

BACKGROUND OF THE INVENTION

The military and the police must train for situations that involve deadly force. One widely used training system is the Multiple Integrated Laser Engagement System (MILES) that equips each participant with vest containing a series of laser light detectors and suitable electronics. Participants use weapons that fire a laser beam along with a blank round. If a participant's detector is illuminated by a weapon's laser beam, the system provides a signal to the participant and a central command that he has been killed or wounded. MILES permits participants to conduct simulations using real weapons ranging from handguns to heavier weapons without subjecting the participants to the obvious danger of using real ammunition in those weapons.

One common military device that has been difficult for MILES to stimulate is the hand grenade. The typical MILES grenade cannot conveniently use a laser to signify a detonation because a grenade detonates in an unpredictable position after being propelled a distance from the user. Furthermore, a grenade is not directional like a bullet or a laser; it can kill or wound multiple people who are unprotected and within a "kill radius" distance of the grenade. Accordingly, the MILES grenade must be able to provide information upon detonation that each participant's receiver will use to determine if that participant is within the kill radius of a prototype grenade.

S. Sampson et. al., U.S. Pat. No. 6,579,097, discloses a MILES grenade that emits encoded infrared signals on detonation. The system tracks the location of each participant and the location of detonation of the grenade, and 'kills' participants within the fill radius of a detonating grenade.

R. Lynch et al., U.S. Pat. No. 6,569,011, discloses a paintball system where locations are tracked and participants within a predetermined distance of a simulated grenade are designated as 'killed'.

C. Campagnuolo, SIR H1415, discloses a MILES system where the grenade makes a distinct noise and MILES bases damage to a participant on the amplitude of the received noise signal.

The U.S. Department of Energy, in an undated specification for MILES equipment, requires a MILES hand grenade to have an effective kill radius of up to 10 meters, an electronic output to interface directly with the MILES equipment, and an output signal that provides an indication to participants that the grenade exploded. An undated specification sheet by Schwartz Electro-optics Inc. shows a grenade simulator designed to those specifications. The Schwartz simulator is understood to generate an RF signal of sufficient strength to be detected only within the kill radius.

One difficulty with existing grenade simulators based on noise is that battlefield simulations are noisy environments, and a determination of distance based on amplitude of a received audio or electronic signal is not reliable. A difficulty with simulators using multiple laser outputs is possible eye damage to participants from the high output lasers used in some of these devices. A difficulty with grenades that rely on the intensity of an RF signal is that a hand grenade is activated after being thrown by a user, and it may land in any orientation. The uncertain position of the grenade antenna with respect to the receiver provides an uncertainty in the strength of the received signal.

SUMMARY OF THE INVENTION

It is an object of this invention to provide a grenade simulator that utilizes the time difference between generation and receipt of a sound signal to determine the distance from the grenade to a participant.

To achieve the foregoing and other objects, and in accordance with the purpose of the present invention, as embodied and broadly described herein, Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
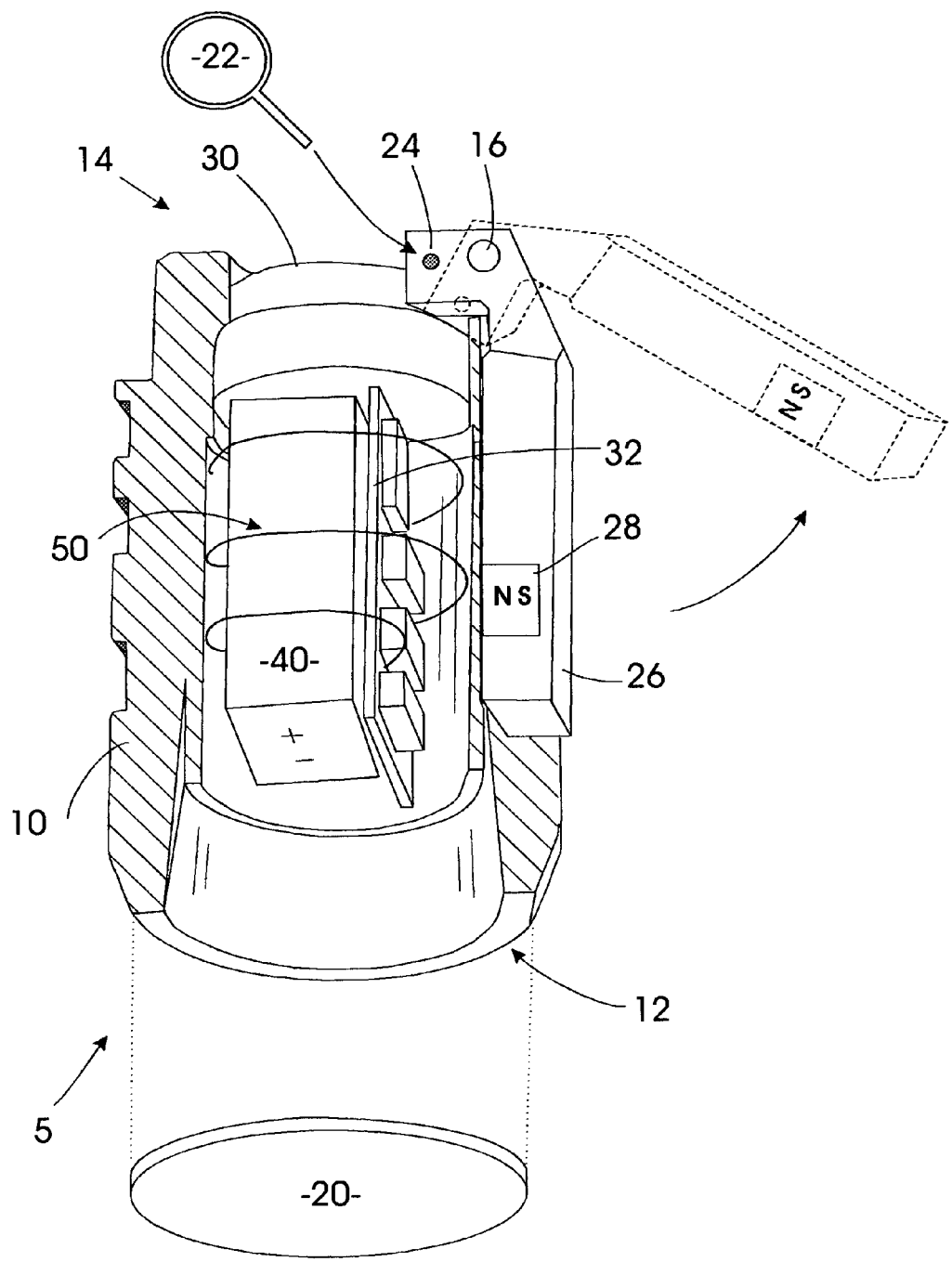
FIG. 1 shows a cut-away view of a grenade simulator according to this invention.

As shown in FIG. 1, a MILES hand grenade 5 simulates a prototype hand grenade by having a tubular plastic case 10 with a cap 20 for sealing one end 12 and an opposed end 14 having a pivoting handle 26 that rotates around and is connected to case 10 by a slender cylindrical pivot 16. As is well known in the art, the structure at the connection of handle 26 to case 10 may function in the manner of a hinge. Handle 26 is spring-loaded by a spring 23 (FIG. 2) to move from a stored position (solid lines) parallel to the side of case 10 to a released position (dotted lines) at an angle to case 10. Handle 26 is held in the stored position by a pin 22 that extends through aligned hole 24 in handle 26 and case 10.

As in a prototype grenade, the user's throwing hand holds handle 26 against case 10 while pin 22 is pulled. The grenade is then thrown at a target. In the prototype, once the grenade is released by the thrower's hand, the spring-loaded handle moves to the released position and activates a sort (typically 5 seconds) delay prior to detonation of an explosive contained within the body of the grenade. The explosion propels fragments of the case of the grenade randomly in a 360° radius from the grenade, and has a 'kill radius' of about 10 feet.

Simulator grenade 5 contains an audio transducer 30 for generating sounds as described hereinafter, a circuit board 32 holding electronics as described in FIG. 2, a battery 40, and a wire antenna 50 that extends from circuit board 32 and may wrap helically around the interior of case 10 for transmitting RF signals. This grenade generates a unique RF signal and a distinguishable audio signal, and relies on a MILES receiver 60 (FIG. 3) to determine the distance from grenade 5 to receiver 60 by measuring the delay between receipt of the RF signal and the audio signal.

Figure 2:
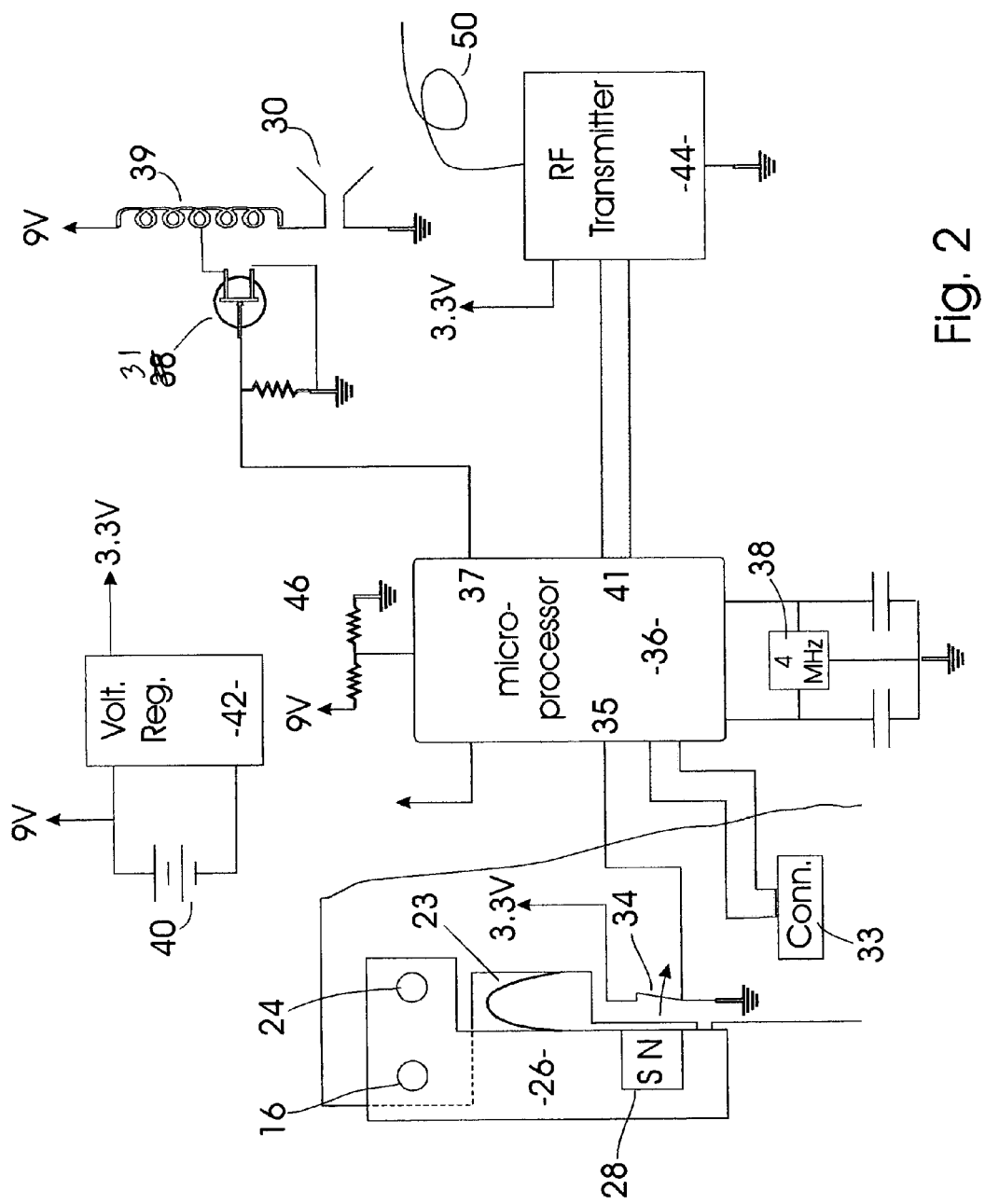
FIG. 2 shows details of the grenade of FIG. 1.

A schematic representation of a preferred embodiment of the major electronic components of grenade 5 is shown in FIG. 2. The actual implementation of the device includes additional biasing and other circuitry that is a matter of routine design to one of ordinary skill in the art.

FIG. 2 shows handle 26 in the closed position. Pin 22 has been pulled from hole 24, so handle 26 will be rotated about pivot 16 to the release position by spring 23 as soon as handle 26 is released by the user. Handle 26 contains a permanent magnet 28 that lies in operational proximity to a magnetically actuated switch 34 embedded at the surface of case 10. Switch 34 is held closed by magnet 28 when handle 26 is in the closed position (as shown); and switch 34 opens when handle 26 moves magnet 28 away from switch 34.

A standard 9 volt 'transistor' battery 40 provides power for grenade 5. Most of the electronics in the preferred embodiment operates at a lower voltage, so the output of battery 40 is applied through a voltage regulator 42 on circuit board 32 in a conventional manner to obtain a 3.3 volt output. These voltages are a matter of design choice and it is contemplated that other batteries and voltage levels may be used in the practice of the invention.

The 'brain' of grenade 5 is a microprocessor 36 such as the Atmel® AT90LS4433. A 4 MHz ceramic resonator 38 is connected to provide a reference frequency for microprocessor 36. A voltage through switch 34 to input 35 provides an interrupt to activate microprocessor 36 when handle 26 is released. One output 37 of microprocessor 36 controls a power MOSFET switch 31 to control the application of +9 volts to audio transducer 30 through a fly-back coil 39. Other outputs 41 communicate with an RF transmitter 44 such as a 916.5 MHz TR1000 transceiver from RFM®. Previously described antenna 50 connects to the output of transmitter 44. A connector 33 on circuit board 32 is accessible through end 12 of case 10 and provides for programming microprocessor 36 in a manner well known to those of ordinary skill in the art. Microprocessor 36 also monitors the state of battery 40 through an input from resistive divider 46 so that a low-voltage warning may be generated.

Figure 3:
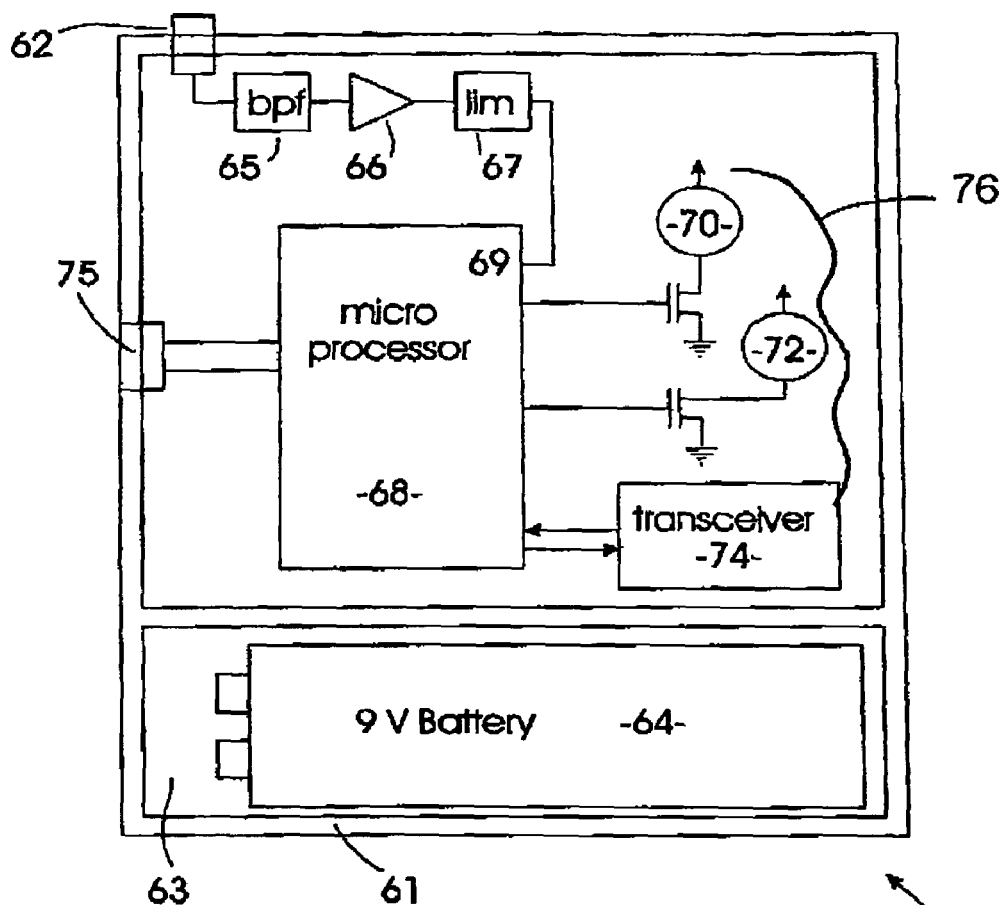
FIG. 3 shows details of a receiver utilized with the grenade of FIG. 1.

Grenade 5 communicates with a receiving unit 60 preferably worn on a MILES vest (not shown). As shown in FIG. 3, receiving unit 60 may be carried in a small rugged box 61 that has a microphone 62 extending through one surface for receiving audio signals. In one embodiment, box 61 has a separate compartment 63 for a 9 volt battery 64 that provides circuit power in a manner similar to the grenade power supply. Box 61 may be fastened to the participant by plastic ties, a hook-loop arrangement such as Velcro®, or any other technique. Typically, box 61 would be fastened to a MILES vest worn by the participant.

Similar to real battlefields, simulated battlefields can be very noisy. The output of microphone 62 is band-pass filtered by filter 65 to limit the processing to signals in a predetermined frequency range, amplified by amplifier 66, and limited to two distinct voltage levels (such as the power supply voltage of 3.3 volts and 0 volts) by limiter 67. This voltage is then applied to an input 69 of microprocessor 68, which microprocessor may be equivalent to the grenade microprocessor 36. Receiving unit 60 also has a MOSFET-controlled audio transducer 70, a MOSFET-controlled light emitting diode (LED) 72, and an RF receiver 74 that also may be a transceiver equivalent to grenade transceiver 44. These components are controlled by outputs from microprocessor 68 and are mounted on a circuit board (not shown) within box 61 such that outputs of transducer 70 and LED 72 communicate outside box 61 through openings in the box surface. Transceiver antenna 76 is contained within box 61. A connector 75 for programming microprocessor 68 may be placed within or at the surface of box 61. Construction of this device is a routine matter of engineering design for one of ordinary skill in the art.

The operation of the aforementioned grenade 5 and receiver 60 is as follows: A simulated explosion consists of the grenade 5 emitting an identifiable audio signal from transducer 30 and transmitting a specially coded radio signal. The area of effect of the simulated grenade explosion is estimated by measuring the distance between the grenade 5 and receiver 60. The receiver 60 determines distance by measuring the difference in arrival times between the radio signal transmitted by transmitter 44 to antenna 76 at the speed of light and the audio signal transmitted by transducer 30 to microphone 62 at the speed of sound.

Sound waves travel approximately one foot per millisecond. Over a distance of a few hundred feet, the transit time for the radio signal is less than one microsecond, which means that the receiver 60 may consider the time of receipt of the radio signal to be identical to the time of transmission. Microprocessor 68 can determine the distance by counting clock pulses between receipt of the radio pulse and receipt of the audio pulse. Any time delay between audio and radio transmissions from grenade 5 is a constant property of that device which is easily factored into the distance calculation by microprocessor 68. The acoustic and radio signals are preferably transmitted nearly simultaneously, i.e., within a millisecond of each other, to simplify the distance calculations.

Figure 4:
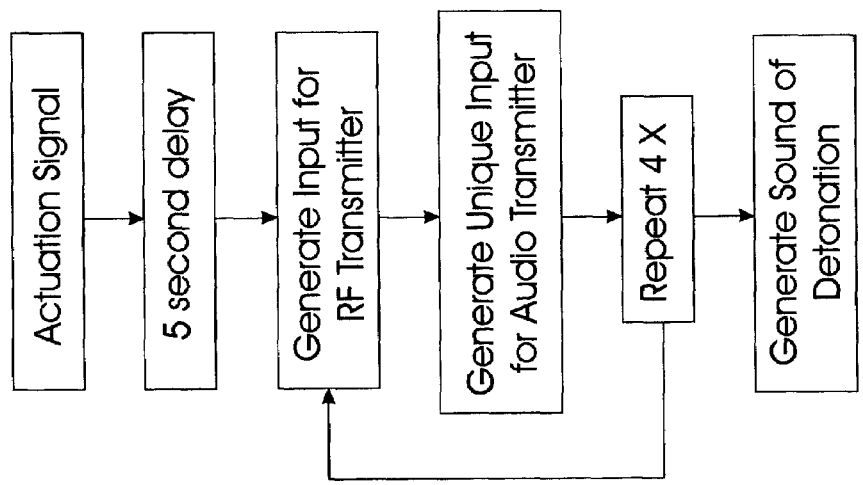
FIG. 4 is a flowchart of the grenade actions.

In a preferred embodiment of the invention, as indicated in FIG. 4, once handle 26 is released, grenade microprocessor 36 starts a 5-second delay after which radio 44 transmits 2400 bits per second using AM modulation of a 916.5 MHz RF carrier signal from antenna 50. The RF signal data identifies the grenade and is preferably encoded using bi-phase-L (Manchester) and consists of a 7-byte preamble, 1 frame byte, 2 data bytes, and a single byte-sum error check. Nearly simultaneously, microprocessor 36 generates an acoustic signal by driving piezoelectric transducer 30 for 12 cycles of a 3200 Hz square wave signal. To increase the likelihood of reception, the radio message and acoustic pulse are repeated four more times at 100 ms intervals. The 100 ms delay between the repeated transmissions ensures the subsequent transmissions do not interfere with earlier transmissions.

Following the aforementioned communications, the transducer 30 of grenade 5 transmits a 250 ms pulse at 2600 Hz and 120 dB to simulate the acoustic effects of a detonating grenade. This signal is not part of the distance-determining process discussed above, but it does inform war-game participants that a grenade detonated nearby. The grenade then may enter a diagnostic phase that "chirps" transducer 30 approximately every 10 seconds so personnel can locate the grenade. A double "chirp" is used to signify the battery needs replacing. Closing handle 26 and switch 34 puts microprocessor 36 into "sleep" mode to conserve battery power.

After being powered on, the receiver 60 first enters a 5-second diagnostic period that indicates battery health. LED 72 illuminates continuously to indicate that the battery's charge is adequate. A blinking LED indicates the battery is near exhaustion. The LED extinguishes after the 5-second period and the receiver begins operation. Other such housekeeping chores known in the art may also be accomplished.

Radio transceiver 74 (FIG. 3) is tuned to receive a grenade radio signal. After receiver 74 informs microprocessor 68 that a grenade RF signal has been received, microprocessor 68 begins monitoring audio output from microphone 62. War games typically are very noise environments; therefore, to authenticate the receipt of a signal from a grenade 5, microprocessor 68 analyzes the amplified, filtered and limited audio output for the presence of five consecutive 3200±100 Hz square-wave signals. Since grenade 5 transmitted 12 consecutive 3200 Hz signals five times, there is a good probability that receiver 60 will authenticate a transmitted grenade signal. But it is extremely unlikely that audio inputs to microphone 62 from other objects will pass this test.

Once the received audio signal is authenticated, receiver 60 determines the distance from grenade 5 by measuring the time between receipt of the RF signal by receiver 74 and receipt of the audio signal by microphone 62. For example, assuming no delay between transmission of the RF and audio signals from grenade 5, if the audio signal is authenticated by receiver microprocessor 68 within 15 ms after the RF signal was detected, then grenade 5 detonated within 15 feet of receiver 60. The receiver indicates this distance by generating an audible tone from transducer 70. The tone pulsates if the grenade is determined to be in a range of between 10 and 15 feet, thereby indicating the participant has been injured by the simulated blast; and the tone is continuous if the distance is less than 10 feet, indicating the participant has been killed by the blast.

An output of microprocessor 68 may also communicate with conventional MILES equipment carried by the participant. Information concerning the participant's status, location, and the identity of the grenade may be transmitted to a central MILES processing station where instructors monitor the flow of action during the simulation. Conventional MILES system already provide for transmitting this information with respect to projectile injuries inflicted on participants during the war-games.

The receiver microprocessor 68 may also be programmed to use statistics to determine the extent of injury received by a participant. For example, if 70% of combatants who are within 10 feet of an exploding prototype grenade are killed, 25% are injured, and 5% are unharmed, then the microprocessor can apply these statistics to a determination that a receiver was within 10 feet of the grenade to give the participant a 30% chance of not being designated as killed, thereby mimicking reality.

As noted above, a hand grenade is a unidirectional device with a blast pattern corresponding to the radiation patterns of the radio and audio signals transmitted by the simulated grenade 5. However, the technology utilized in this invention also extends to semi-directional weapons such as the Claymore mine.

The prototype M18 Claymore, a directional fragmentation mine, is 8-½ inches long, 1-⅜ inches wide, 3-¼ inches high, and weighs 3-½ pounds. The mine contains 700 steel spheres (10.5 grains) and 1-½ pound layer of composition C-4 explosive. The Claymore is mounted facing the expected position of the enemy and projects from the front of the device a fan-shaped pattern of steel balls in a 60-degree horizontal arc, at a maximum height of 2 meters, and covers a casualty radius of 100 meters. The optimum effective range (the range at which the most desirable balance is achieved between lethality and area coverage) is 50 meters. The forward danger radius for friendly forces is 250 meters. The backblast area is unsafe in unprotected areas 16 meters to the rear and sides of the mine. Friendly personnel within 100 meters to the rear and sides of the mine should be in a covered position to be safe from secondary missiles.

Figure 6:
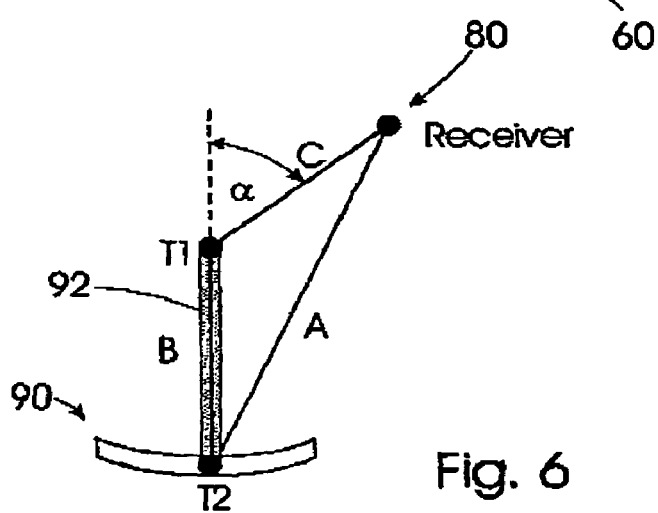
FIG. 6 shows the arrangement of components of a Claymore mine simulator.
Figure 5:
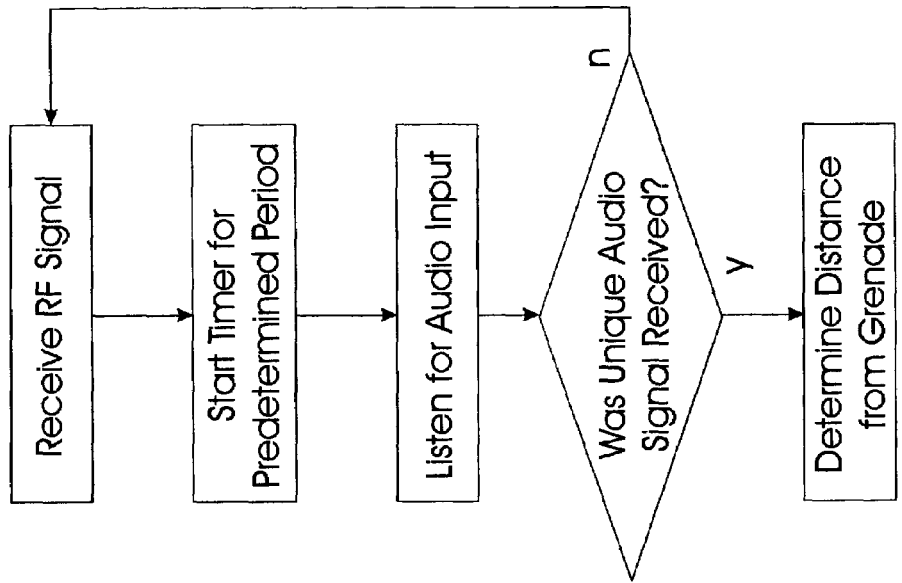
FIG. 5 is a flowchart of the receiver actions.

To determine the effect of a detonating Claymore simulator in a MILES exercise, both the distance and the location of a participant relative to the front of the mine must be determined. As shown in FIG. 6, a simulated Claymore has two spaced acoustic transducers T1 and T2. Transducer T2 preferably is on a container that replicates the prototype Claymore mine in size and weight. Transducer T1 is mounted on an arm 92 that extends in front of the container a distance B (which distance could be on the order of one foot). T1 and T2 transmit acoustically distinct signals that are each processed by a receiver 80 located a distance C from T1 and a distance A from T2.

The receiver 80 determines each of distances C and A in the same manner that the receiver 60 of FIG. 3 determined distance from grenade 5. The outputs from the two transducers may be distinguished from each other using either frequency or time separation in a manner well known in the art.

The angle $\alpha$ from T1 to the receiver is $\alpha = \arccos[(A^2-B^2-C^2)/2BC]$. This angle is easily calculated by microprocessor 68 once distances A and C have been determined as set forth above. The combination of range and angle information enables the receiver microprocessor to set an appropriate 'killed' or 'wounded' alarm based on a comparison of the position of the receiver to the known blast effect of a Claymore mine.

It should be apparent that there are many modifications possible with this invention, as long as the concept of using an electrical signal in combination with an audio signal to determine the kill radius of a simulated detonation is followed. For example, the term 'MILES' as used herein is describes any system that utilizes participant-carried detectors to simulate receipt of a weapon's effect on a participant. The Department of Energy's Engagement Simulation System is another example of such a system. Also, while the system is described for a simulated hand grenade and Claymore mine, the invention is applicable to many applications involving the determination of distance between two devices, including any simulated explosion, such as may be caused by a projected explosive or a stationary mine, among other things. And those of ordinary skill in the art will recognize that many variations of the electronic circuitry in the grenade and receiver will accomplish the desired results. The actuation of the audio and RF signals may be by timer, as for the grenade, or remote signal, as for the Claymore mine. Many variations in programming the microprocessors and coding the acoustic and RF signals may be utilized to transmit the desired information and to minimize reception problems caused by the many other RF and audio signals being transmitted during a MILES exercise. It is intended that the scope of the invention be defined by the appended claims.

What is claimed is:

1. A system for determining the distance between a case and a detector wherein:

said case includes:
an RF transmitter of a RF signal when actuated;
an audio transmitter of an audio signal when actuated; and actuator means for actuating said RF transmitter and said audio transmitter;

said detector includes:
an RF receiver of said RF signal;
an audio receiver of said audio signal;
means for determining the distance from said case to said detector as a function of the time between the receipt of said RF signal and the receipt of said audio signal; and,
means for generating an indication, only when the determined distance is within a reference distance of said detector.

2. The system of claim 1 wherein said case is a simulated explosive device and, said actuator means simulates activation of said device.

3. The system of claim 2 wherein said detector comprising means for actuating said audio receiver in response to reception of the RF signal.

4. The system of claim 3 wherein said detector further comprises means for authenticating receipt of the audio signal transmitted by said audio transmitter.

5. A system for determining the distance between a simulated explosive device and a detector wherein:
said simulated explosive device comprises a case including;
an RF transmitter of a RF signal when actuated;
an audio transmitter of an audio signal when actuated; and
actuator means for actuating said RF transmitter and said audio transmitter;
said detector includes:
an RF receiver of said RF signal;
an audio receiver of said audio signal;
a programmed detector microprocessor including;
means for actuating said audio receiver, only upon receipt of said RF signal by said RF receiver;
means for authenticating the receipt of said audio signal;
means for determining the distance from said explosive device to said detector, as a function of the time between the receipt of said RF signal, and the receipt of said audio signal.

6. The system of claim 5 wherein said detector includes means for generating a first indication and a second indication wherein:
said first indication being generated if the distance from said simulated explosive device to said detector is within a first reference range; and,
said second indication being generated if the distance from said explosive device to said detector is within a second reference range.

7. The system of claim 6 including means for adjusting at least one of said first and second indications by a probability.

8. A system for determining the distance between a simulated hand grenade and a detector, wherein:
said simulated hand grenade comprises a case including;
an RF transmitter of a RF signal when actuated;
an audio transmitter of an audio signal when actuated; and
actuator means for actuating said RF transmitter and said audio transmitter, said actuator means including;
a trigger for generating an electrical signal when said trigger is released;
means for delaying the actuation of said RF transmitter, and said audio transmitter, for a first predetermined time after said electrical signal is generated;
said detector including;
an RF receiver of said RF signal;
an audio receiver of said audio signal; and,
means for determining the distance from said simulated hand grenade to said detector, as a function of the time between the receipt of said RF signal, and the receipt of said audio signal.

9. The system of claim 8 wherein said case includes a programmed case microprocessor, said case microprocessor including said means for delaying the actuation of said RF transmitter and said audio transmitter by the first predetermined time, said RF transmitter and said audio transmitter being actuated substantially simultaneously.

10. The system of claim 9 wherein said case microprocessor includes means for causing at least one re-transmission of said RF signal and said audio signal, said at least one re-transmission, delayed from an initial transmission, by a second predetermined time.

11. The system of claim 9 wherein said case microprocessor includes means for causing said audio transmitter to generate a loud pulse noise simulating the noise of an exploding hand grenade, said pulse noise occurring after said RF and audio signals are transmitted.

12. A system for determining the distance between a simulated directional explosive and a detector, and an angle between the detector and an axis of the directional explosive, the system comprising:
said simulated directional explosive comprising a case, said case including;
an RF transmitter of a RF signal when actuated;
a first audio transmitter of a first audio signal when actuated; and,
actuator means for actuating said RF transmitter, said first audio transmitter, and a second audio transmitter;
said second audio transmitter transmitting a second audio signal when actuated, said second audio transmitter spaced a reference distance from, and operatively connected to, said case;
said detector includes;
an RF receiver of said RF signal;
an audio receiver of said first and second audio signals;
means for determining a first distance from said detector to said first audio transmitter, and a second distance from said detector to said second audio transmitter, as a function of the time between the receipt of said RF signal, and the receipt of said first and second audio signals; and,
means for determining the angle between the detector and the axis of the directional explosive, as a function of said first distance, said second distance, and said reference distance.

13. The system of claim 12 wherein said detector includes means for generating an indication, only when at least one of said first distance and said second distance, is determined to be within a reference range.

14. The system of claim 13 wherein said reference range is a function of said angle between the detector and the axis of the directional explosive.

* * * * *